United States Patent [19]
Peterson, II

[11] 3,861,414
[45] Jan. 21, 1975

[54] BI-DIRECTIONAL FLOW STOP VALVE

[76] Inventor: William Donald Peterson, II, 1996 East 4675 South, Salt Lake City, Utah 84117

[22] Filed: Oct. 4, 1972

[21] Appl. No.: 294,887

[52] U.S. Cl............ 137/512.3, 137/493.9, 137/517
[51] Int. Cl............................................. F16k 17/26
[58] Field of Search............ 137/454.5, 460, 493.9, 137/512.3, 512.5, 516.25, 516.27, 517, 540, 519.5

[56] References Cited
UNITED STATES PATENTS

| | | | |
|---|---|---|---|
| 922,578 | 5/1909 | Gries................................... | 137/517 |
| 1,177,831 | 4/1916 | Taylor et al. .............. | 137/516.25 X |
| 1,451,644 | 4/1923 | Zachary........................... | 137/517 X |
| 2,569,316 | 9/1951 | Jerman ............................... | 137/517 |
| 2,635,629 | 4/1953 | Asaro................................. | 137/517 |
| 2,757,616 | 8/1956 | Hill et al. ...................... | 137/512.3 X |
| 2,929,399 | 3/1960 | Magowan, Jr. ................. | 137/517 X |
| 3,144,876 | 8/1964 | Frye.................................. | 137/454.5 |
| 3,437,065 | 4/1969 | Robbins............................. | 137/517 |
| 3,456,442 | 7/1969 | Brooks........................... | 137/517 X |

FOREIGN PATENTS OR APPLICATIONS

| | | | |
|---|---|---|---|
| 11,435 | 5/1907 | Great Britain...................... | 137/517 |

*Primary Examiner*—Robert G. Nilson

[57] ABSTRACT

A flow control valve which remains fully open in normal calibrated flow rates and fully closes at a higher flow rate and remains closed until pressure across the valve is equalized. The valve having the capability of closing due to excessive fluid flow in either direction through the valve. The primary method of closure being independent of fluid viscosity thus the valve being usable for heterogeneous fluids. The valve housing being constructed such that the valve can be placed and removed from deep down in an oil or gas well, even below an ocean floor, to stop fluid flow and spill due to pipe line failure or other line breakage.

3 Claims, 5 Drawing Figures

PATENTED JAN 21 1975 3,861,414
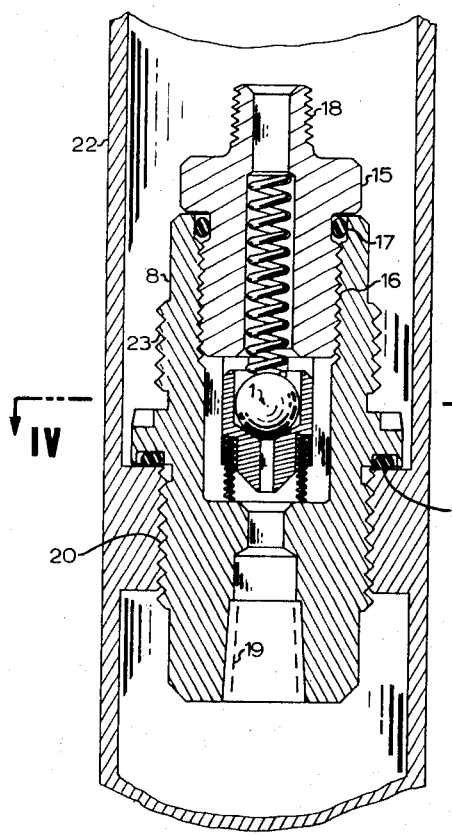
FIG. I
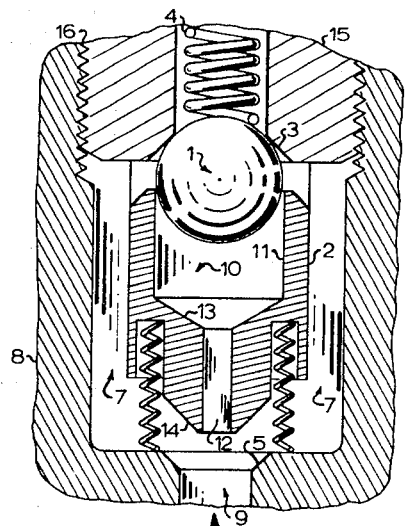
FIG. II
PRIMARY FLOW DIRECTION
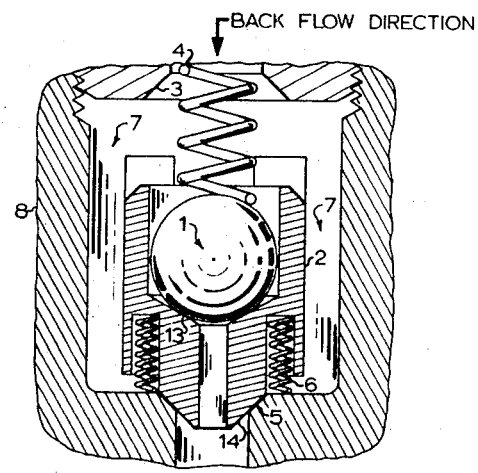
BACK FLOW DIRECTION
FIG. III
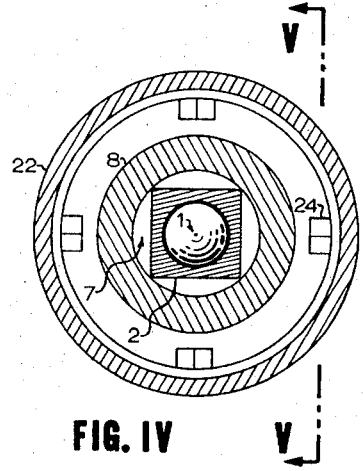
FIG. IV
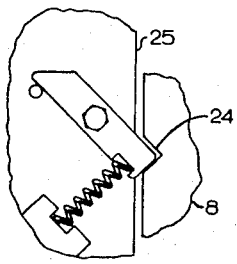
FIG. V

BI-DIRECTIONAL FLOW STOP VALVE

BACKGROUND OF THE INVENTION

The present invention relates to a need for being able to stop fluid flow when a normal flow rate is exceeded. It is desired that such a valve operate reliably with a variety of fluids or a heterogeneous fluid and not have different closure flow rates due to changes in usage fluid viscosities such as caused by temperature changes in hydraulic systems.

Valves of previous designs function by a principal of line pressure drop and thus close at high flow rates with low viscosity fluids and low flow rates with high viscosity fluids. Since viscosities of fluids vary greatly with temperature, the function of valves of previous designs vary greatly with temperature. The invented valve functions independent of viscosity by principal in the primary flow direction.

The invention's need is apparent in high pressure autoclave reactor systems such as reactors by liquefaction of coal where hydro-carbon liquids in a media of hydrogen are moving through many vessels. One vessel's leaking or failure could cause total loss from all vessels unless precautions are taken. Large fluid losses are extremely hazardous due to the explosive nature of the fluid in this case. By locating a "bi-directional flow stop valve" between each of the many pressure vessels, a pressure vessel catastrophic breakage would result in fluid loss from only the broken vessel.

Another need for such a valve is to control oil and gas flow from wells. It would be desirable to place such a valve deep down in a well, even below an ocean floor, to stop fluid flow and spill due to pipe line failure or other line breakage. Also, with a "bi-directional flow stop valve" on each well of a group of wells, the wells can be piped together with the valves preventing fluid flow from one well into another.

SUMMARY OF THE INVENTION

The invention is a normally open valve which closes and remains closed when a calibrated flow rate is exceeded in either flow direction and remains closed until the pressure across the valve is equalized. The amount of fluid flow required to close the valve is predetermined by preloading springs in the valve which hold the valve gates open. The amount which the springs are preloaded or the amount of force required to close the valve is proportional to the square of the closure flow rate.

The valve body is constructed such that it can be coupled to piping. The valve body is also constructed with provisions such that the valve can be placed and secured and removed from deep down within well casings.

BRIEF DESCRIPTION OF THE DRAWING

FIG. I is a sectional view of an entire valve placed in a well casing. The check ball is shown fully into the ball housing in the valve open position; likewise, the ball housing is shown in position fully away from its seat. This is the normal position for items for normal fluid flow through the valve in either direction.

FIG. II shows the check ball in the closed position as would occur with excessive fluid flow in the primary flow direction. The captive fluid pressure chamber is shown fully expanded behind the ball, forcing the ball against the spring and into the seat, blocking the flow of fluid from the overpass chamber. Since fluid does not flow directly over the valve gate, which is the ball, the valve closure in the primary fluid flow direction is independent of fluid viscosity.

FIG. III shows the ball housing in the closed position as would occur with excessive fluid back flow. Note that the check ball seats into the ball housing as well as the ball housing seating into the valve body. The fluid momentum, weight and velocity, causes this closing force; also, since the fluid passes over and around the ball housing in the overpass chamber, the differential pressure due to fluid viscosity also aids in forcing valve closure when excessive fluid flow back occurs.

FIG. IV is a cross sectional view of the valve in a well casing. The fluid overpass chamber is shown between the ball housing and valve body, the check ball being within the ball housing.

FIG. V is a detail side view of a cam-lock detent with an illustrated insertion tool cam-lock for locking on the tool for preventing its unscrewing when screwing out a valve for removing it from a well casing.

DESCRIPTION OF THE PREFERRED EMBODIMENTS

A check ball 1 provides for valve closure for the primary fluid flow direction. Likewise, the check ball 1 and ball housing 2 provides for valve closure for the fluid back flow direction. The check ball 1 is held away from its closure seat 3 in the valve open position by a preloaded spring 4. Likewise, the ball housing 2 is held away from its closure seat 5 in the valve open position by preloaded springs 6. Fluid passing through the valve enters at one valve seat 5, 3 then flows around the outside of the ball housing 2 by route of the fluid overpass chamber 7 and out of the valve through the other valve seat 3, 5. The fluid overpass chamber 7 is formed by the external walls of the ball housing 2 and the internal walls of the valve body 8 between valve seats 3 and 5 and is large in cross stream area as compared to the fluid inlet 9 so that the pressure drop from the inlet valve seat 5, 3 to the outlet valve 3, 5 will be minimal. There is clearance between the external of the ball housing 2 and the interior of the valve body 8 so that the ball housing 2 can slide freely in the overpass chamber 7, restricted only by springs 4 and 6 forces and fluid pressures.

When fluid is flowing through the valve in the primary flow direction, the check ball 1 is forced against the spring 4 to closure by pressure of captive fluid in a chamber 10 formed by the internal cylindrical walls 11 of the ball housing 2 and one hemispherical side of the ball 1. The captive fluid pressure chamber 10 is connected directly in line to the fluid inlet 9 flow stream through an orifice 12. The orifice 12 fluid entry is in the overpass chamber 7 and directly in line with the fluid inlet 9 flow stream, but not directly in the fluid inlet 9 to keep the pressure drop minimal between the orifice 12 entry and the valve closure seat 3. The weight and velocity of the flowing fluid impeding upon the orifice 12 causes a pressure increase within the captive fluid pressure chamber 10 and when the velocity is sufficiently high a sufficient force is exerted on the ball 1 to force it against the opposing spring 4 and into the valve closure seat 3.

For fluid flow in the flow back direction, fluid flow directly impeding upon the check ball 1 forces the check ball 1 into a seat 13 in the ball housing 2. When the fluid flow back is sufficiently high, fluid force directly on the ball 1 and ball housing 2 presses the ball housing 2 against the opposing springs 6 into the valve closure seat 5. To maintain a proper seal and assure proper alignment in valve closure, the orifice 12 end of the ball housing 2 is shaped into a conical valve plug 14 which inserts into the valve seat 5 at closure.

To facilitate valve construction the primary flow valve spring 4 is housed in a spring housing body 15 which screws with threads 16 into the valve body 8. An O-ring 17 seals the spring housing body 15 to the valve body 8. The ends of the valve may have male 18 or female 19 pipe connections for adapting the valve into a fluid pipe line. The valve body 8 may also have a threaded adapter section 20 and a seal 21 for adapting the valve to a well casing 22. The valve body 8 may also have a threaded section 23 and cam-lock detents 24 for holding and coupling the valve to an installing tool 25 for inserting the valve into and removing it from a well casing 22.

I claim:

1. A flow control valve comprising a valve body having an inlet, an outlet and a fluid passage for a flow of fluid therethrough, a ball housing disposed in said fluid passage, said ball housing having a chamber with a check ball disposed therein, said ball housing further having an orifice integral therewith and directly in line with said inlet to provide a communication between said fluid passage and said chamber, said check ball being movable, by a pressure exerted thereon, against a spring to engage a check ball seat formed on said outlet, said pressure being created by said fluid accumulated in said chamber, a valve seat formed by said inlet and a valve plug formed by an end of said ball housing proximate said orifice, said ball housing being movably secured to said valve body to allow said valve plug to engage said valve seat to stop fluid flow under conditions of fluid backflow through the valve.

2. A flow control valve according to claim 1 and further having said check ball assume a position in said ball housing to prevent fluid leakage through said orifice under conditions of fluid backflow when said valve seat is engaged by said valve plug.

3. A flow control valve according to claim 2 and further having springs disposed in said fluid passage between said valve seat and said valve plug and tending to hold said valve plug away from said valve seat.

* * * * *